(12) United States Patent
Dion et al.

(10) Patent No.: US 8,475,946 B1
(45) Date of Patent: Jul. 2, 2013

(54) CERAMIC ARTICLE AND METHOD OF MANUFACTURE

(75) Inventors: Sebastien Dion, Gatineau (CA); John Balistreri, Bowling Green, OH (US); Amber Reed, Bowling Green, OH (US)

(73) Assignee: Bowling Green State University, Bowling Green, OH (US)

( * ) Notice: Subject to any disclaimer, the term of this patent is extended or adjusted under 35 U.S.C. 154(b) by 1328 days.

(21) Appl. No.: 11/725,926

(22) Filed: Mar. 20, 2007

(51) Int. Cl.
*B32B 15/04* (2006.01)
*B32B 18/00* (2006.01)

(52) U.S. Cl.
USPC ........... 428/702; 428/325; 428/624; 428/688; 428/689; 428/701

(58) Field of Classification Search
USPC .................. 428/688, 701, 702, 325, 624, 689
See application file for complete search history.

(56) References Cited

U.S. PATENT DOCUMENTS

| | | |
|---|---|---|
| 2,522,548 A | 9/1950 | Streicher |
| 3,525,632 A | 8/1970 | Enoch |
| 3,821,006 A | 6/1974 | Schwartz |
| 3,926,870 A | 12/1975 | Keegan et al. |
| 3,930,872 A | 1/1976 | Toeniskoetter et al. |
| 4,369,025 A | 1/1983 | von der Weid |
| 4,444,594 A | 4/1984 | Paddison et al. |
| 4,665,492 A | 5/1987 | Masters |
| 4,755,227 A | 7/1988 | Sherif et al. |
| 4,758,278 A | 7/1988 | Tomic |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,132,143 A | 7/1992 | Deckard |
| 5,147,587 A | 9/1992 | Marcus et al. |
| 5,154,762 A | 10/1992 | Mitra et al. |
| 5,155,324 A | 10/1992 | Deckard et al. |
| 5,176,188 A | 1/1993 | Quinn et al. |
| 5,204,055 A | 4/1993 | Sachs et al. |
| 5,252,264 A | 10/1993 | Forderhase et al. |
| 5,279,665 A | 1/1994 | Yunovich et al. |
| 5,296,062 A | 3/1994 | Bourell et al. |
| 5,301,415 A | 4/1994 | Prinz et al. |
| 5,316,580 A | 5/1994 | Deckard |
| 5,340,656 A * | 8/1994 | Sachs et al. .................. 428/546 |

(Continued)

FOREIGN PATENT DOCUMENTS

| | | |
|---|---|---|
| DE | 198 53 834 | 5/2000 |
| DE | 101 58 233 | 3/2003 |

(Continued)

OTHER PUBLICATIONS

Alair Griffin, Design Issues: Ceramic Rapid Prototyping Options.

(Continued)

*Primary Examiner* — Jennifer McNeil
*Assistant Examiner* — Lauren Colgan
(74) *Attorney, Agent, or Firm* — Marshall & Melhorn, LLC

(57) ABSTRACT

The present invention includes a method of preparing a ceramic precursor article, the ceramic precursor made thereby, a method of making a ceramic article and an article made by that method. It also includes a method of replicating a ceramic shape.

18 Claims, 13 Drawing Sheets
(6 of 13 Drawing Sheet(s) Filed in Color)

U.S. PATENT DOCUMENTS

| | | |
|---|---|---|
| 5,342,919 A | 8/1994 | Dickens et al. |
| 5,352,405 A | 10/1994 | Beaman et al. |
| 5,354,414 A | 10/1994 | Feygin |
| 5,382,289 A | 1/1995 | Bambauer et al. |
| 5,382,308 A | 1/1995 | Bourell et al. |
| 5,387,380 A | 2/1995 | Cima et al. |
| 5,393,613 A | 2/1995 | MacKay |
| 5,429,788 A | 7/1995 | Ribble et al. |
| 5,430,666 A | 7/1995 | DeAngelis et al. |
| 5,433,280 A | 7/1995 | Smith |
| 5,460,758 A | 10/1995 | Langer et al. |
| 5,490,882 A | 2/1996 | Sachs et al. |
| 5,490,962 A | 2/1996 | Cima et al. |
| 5,518,680 A | 5/1996 | Cima et al. |
| 5,527,877 A | 6/1996 | Dickens et al. |
| 5,536,467 A | 7/1996 | Reichle et al. |
| 5,593,531 A | 1/1997 | Penn |
| 5,595,597 A | 1/1997 | Fogel et al. |
| 5,597,589 A | 1/1997 | Deckard |
| 5,616,294 A | 4/1997 | Deckard |
| 5,622,577 A | 4/1997 | O'Connor |
| 5,632,848 A | 5/1997 | Richards et al. |
| 5,637,175 A | 6/1997 | Feygin et al. |
| 5,639,070 A | 6/1997 | Deckard |
| 5,639,402 A | 6/1997 | Barlow et al. |
| 5,640,667 A | 6/1997 | Freitag et al. |
| 5,648,450 A | 7/1997 | Dickens et al. |
| 5,653,925 A | 8/1997 | Batchelder |
| 5,658,712 A | 8/1997 | Steinmann et al. |
| 5,660,621 A | 8/1997 | Bredt |
| 5,688,464 A | 11/1997 | Jacobs et al. |
| 5,697,043 A | 12/1997 | Baskaran et al. |
| 5,718,757 A | 2/1998 | Guillou et al. |
| 5,730,925 A | 3/1998 | Mattes et al. |
| 5,733,497 A | 3/1998 | McAlea et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,772,947 A | 6/1998 | Hull et al. |
| 5,805,971 A | 9/1998 | Akedo |
| 5,851,465 A | 12/1998 | Bredt |
| 5,870,307 A | 2/1999 | Hull et al. |
| 5,902,441 A | 5/1999 | Bredt et al. |
| 5,902,537 A | 5/1999 | Almquist et al. |
| 5,976,339 A | 11/1999 | Andre, Sr. |
| 6,007,318 A | 12/1999 | Russell et al. |
| 6,112,109 A | 8/2000 | D'Urso |
| 6,136,088 A | 10/2000 | Farrington |
| 6,147,138 A | 11/2000 | Hochsmann et al. |
| 6,193,922 B1 | 2/2001 | Ederer |
| 6,217,816 B1 | 4/2001 | Tang |
| 6,299,677 B1 | 10/2001 | Johnson et al. |
| 6,397,922 B1 | 6/2002 | Sachs et al. |
| 6,403,002 B1 | 6/2002 | van der Geest |
| 6,416,850 B1 | 7/2002 | Bredt et al. |
| 6,423,255 B1 | 7/2002 | Hoechsmann et al. |
| 6,600,129 B2 | 7/2003 | Shen et al. |
| 6,610,429 B2 | 8/2003 | Bredt et al. |
| 6,617,546 B2 | 9/2003 | Manetsberger et al. |
| 6,663,811 B2 | 12/2003 | Shen et al. |
| 6,907,307 B2 | 6/2005 | Chen et al. |
| 7,049,363 B2 | 5/2006 | Shen |
| 7,087,109 B2 | 8/2006 | Bredt et al. |
| 2002/0009622 A1* | 1/2002 | Goodson ................. 428/703 |
| 2002/0106412 A1 | 8/2002 | Rowe et al. |
| 2002/0176793 A1 | 11/2002 | Moussa et al. |
| 2002/0195746 A1 | 12/2002 | Hull et al. |
| 2002/0195747 A1 | 12/2002 | Hull et al. |
| 2003/0067098 A1 | 4/2003 | Newell et al. |
| 2003/0085488 A1 | 5/2003 | Newell et al. |
| 2004/0006405 A1 | 1/2004 | Chen et al. |
| 2004/0038009 A1 | 2/2004 | Leyden et al. |
| 2004/0060682 A1 | 4/2004 | Newell et al. |
| 2004/0081573 A1 | 4/2004 | Newell et al. |
| 2004/0138336 A1* | 7/2004 | Bredt et al. ................. 523/160 |
| 2004/0151935 A1 | 8/2004 | Dzugan et al. |
| 2004/0152581 A1 | 8/2004 | Bardes et al. |
| 2004/0173335 A1 | 9/2004 | Schaffer et al. |
| 2004/0182202 A1 | 9/2004 | Geving et al. |
| 2004/0183226 A1 | 9/2004 | Newell et al. |
| 2004/0184944 A1 | 9/2004 | Geving et al. |
| 2004/0226405 A1 | 11/2004 | Geving et al. |
| 2005/0003189 A1* | 1/2005 | Bredt et al. ................. 428/402 |
| 2005/0029175 A1 | 2/2005 | Farr et al. |
| 2005/0161189 A1 | 7/2005 | Sercombe et al. |
| 2005/0242473 A1 | 11/2005 | Newell et al. |
| 2005/0252631 A1 | 11/2005 | Bardes et al. |
| 2009/0035411 A1 | 2/2009 | Seibert et al. |

FOREIGN PATENT DOCUMENTS

| | | |
|---|---|---|
| EP | 0 431 924 | 6/1991 |
| JP | 2001-162351 | 6/2001 |
| WO | WO 93/25336 | 12/1993 |
| WO | WO 95/30503 | 11/1995 |
| WO | WO 97/26302 | 7/1997 |
| WO | WO 98/09798 | 3/1998 |
| WO | WO 98/28124 | 7/1998 |
| WO | WO 00 26026 | 5/2000 |
| WO | WO 01 34371 | 5/2001 |

OTHER PUBLICATIONS

A. Griffin, S. McMillin, C. Griffin and K. Barton, Bioceramic RP Materials for Medical Models.

E.A. Griffin, Rapid Prototyping of Functional Ceramic Composites.

N. K. Vail and J.W. Barlow, Ceramic Structures by Selective Laser Sintering of Micro-encapsulated, Finely Divided Ceramic Materials (Abstract).

M.J. Cima, J. Yoo, S. Khanuja, M. Rynerson, D. Nammour, B. Giritlioglu, J. Grau, E.M. Sachs, Structural Ceramic Components by 3D Printing (Abstract).

Stephen C. Danforth, Fused deposition of ceramics: a new technique for the rapid fabrication of ceramic components (Abstract).

Q.F. Xiang, J.R.G. Evans, M.J. Edirisinghe, P.F. Blazdell, Solid freeforming of ceramics using a drop-on demand jet printer (Abstract).

M.J. Edirisinghe, Solid freeform fabrication of ceramics (Abstract).

D. Gohring, R. Knitter, Rapid manufacturing of ceramic microreactors (Abstract).

Satbir Singh Khanuja, Origin and control of anisotropy in three dimensional printing of structural ceramics (alumina, polyacrylic acid) (Abstract).

G. Wang, V.D. Krstic, Rapid prototyping of ceramic components-review (Abstract).

D. Kochan, T. Himmer, H. Menzer, Development of ceramic design objects by rapid-prototyping technologies (Abstract).

R. Lenk, B. Alm, C. Richter, Ceramic components: From prototype to small series (Abstract).

James Frederic Bredt, Binder stability and powder/binder interaction in three-dimensional printing (prototyping) (Abstract).

Ben Utela, Rhonda L. Anderson, Howard Kuhn, Advanced Ceramic Materials and Processes for Three-Dimensional Printing (3DP) (Abstract).

Zhao, Xinglong; Evans, Julian RG; Edirisinghe, Mohan J.; Song, Jin Hua, Direct ink-jet printing of vertical walls (Abstract).

Charnnarong, Jain, The drying shrinkage in three-dimensional printing and its dependence on the properties of the powder and the binder (inkjet) (Abstract).

Emanuel Sachs, et al., Three-Dimensional Printing: The Physics and Implications of Additive Manufacturing, CIRP Annals—Manufacturing Technology, vol. 42, Issue 1, 1993, pp. 257-260.

* cited by examiner

CERAMIC ARTICLE AND METHOD OF MANUFACTURE

BACKGROUND OF THE INVENTION

In many areas of technology, ceramic products are being used for their inert properties and heat resistance.

Many Rapid Prototyping processes have been developed in recent years and many more are currently being researched, but until recently, few of them have been used to fabricate ceramic objects.

One of the main challenges of the use of ceramic products with modern technologies is its reduction factor (shrinkage). Depending on the process used, drying, firing or hot pressing of a ceramic object can cause shrinkage as high as 20 percent. Such shrinkage can be a significant problem if the nature of the ceramic article requires precise dimensional control.

One of the first patents pertaining to the background of the present invention was obtained by Bredt et al. and is entitled "Method of three dimensional printing" (U.S. Pat. No. 5,902,441), May 11, 1999. This patent described the use of ink-jet print heads to deliver an aqueous solvent to a powder in cross-sections. This patent describes the basic technology of printers that may be used in accordance with the present invention, such as those commercially available from Z-corp of Burlington, Mass. A subsequent patent obtained by Bredt et al. and entitled "Method of three dimensional printing" (U.S. Pat. No. 7,087,109), Aug. 8, 2006 further describes the use of three-dimensional printer systems. Subsequent patents by Jialin Shen (U.S. Published Pat. Appl. 20020016387; 2002) and Kenneth Newell (U.S. Published Pat. Appl. 20040081573; 2004) describe means of producing more stable, stronger, and more durable RP objects through various combinations of binder and solvent. Newell's method produces a "green object," an unfired ceramic negative for use as a mold for injected metal. Improvements in Newell's mold-making methods are found in subsequent patents by Bardes, Bruce Paul et al (U.S. Published Pat. Appls. 20040151935, 20040152581 and 20050252631; 2004 and 2005) and Lynch, Robert F. et al. (U.S. Published Pat. Appl. 20050281701; 2005).

An article entitled "Rapid Prototyping with Ceramics" by Elizabeth A. Judson & Thomas L. Starr of the Materials Science and Engineering of the Georgia Institute of Technology (found at http://www.pelcorcom/library/judson_starr/) explains the use of "Injection Molding and Stereolithography" for the creation of molds for casting purposes.

A publication entitled "The CAM-LEM Process" (found at http://dora.eeap.cwru.edu/camlem/camproc.html) explains how layers of ceramic material can be cut with the use of a computer assisted laser cutter and then stacked and fused in order to obtain a final ceramic article.

Notwithstanding these developments, there remains a need for methods of making shaped ceramics in an efficient manner while reducing the shrinkage attendant to prior art techniques. Some of the improvements sought to the prior art include apparatus, methods and compositions that are capable of producing ceramic precursors with high green strength and more accurate final ceramic shapes with a high degree of veracity to the desired shape, such as through the reduction in shrinkage and distortion. Ceramics produced in accordance with the present invention may also have relatively reduced porosity compared to ceramics from other methods.

SUMMARY OF THE INVENTION

The method of the present invention may be carried out using a version of the Massachusetts Institute of Technology's patented 3DP (Three-Dimensional Printing). The powder-based build system used in accordance with one embodiment of the invention preferably employs ink-jet technology to apply a specific ceramic binder to thin layers of ceramic precursor powder (typically clay powder), rapidly building objects from digital 3D drawing files.

It has been discovered that 3DP processes using certain organic ingredients such as cellulose in the ceramic powder used as a two part binder in preceding technologies (including those described in patents such as those described herein) causes a greater reduction in the final object than is normal in traditional ceramic object making. Due to the combustible nature of these organic binders, the object was left with a porous structure that sometimes caused it to collapse or suffer deformations when exposed to the high heat of the bisque. In order to decrease the reduction factor and increase the object's density, the present invention allows for the production of a ceramic-specific binder that does not require the addition of solid organic binding material to clay recipes. The final objects conform to the standards of traditional ceramics and thus can be used in a multitude of fashions similar to traditional ceramics.

The present invention includes a ceramic precursor article that may be fired into a finished ceramic article of a desired shape that may be predetermined, a method of making the precursor, a method of making the finished ceramic article, and the finished ceramic article made thereby.

Ceramic Precursor Article

In general terms, the present invention may be described as including a ceramic precursor article having a predetermined shape, the article comprising alternately deposited layers of (1) a ceramic precursor powder and (2) a binder comprising water and polyvinyl alcohol, in a pre-determined pattern, such that the ceramic precursor article is of the predetermined shape.

The ceramic precursor powder may comprise any combination of one or more clays and other ancillary material(s) (preferably so as to have plasticity; i.e., workability to be able to take and hold a shape through firing), such as feldspar, refractory cement and/or frit to produce a powder that may be handled and deposited using 3DP equipment, and capable of producing a ceramic precursor article in combination with one or more binder compositions. Preferably, the ceramic precursor powder additionally comprises clay and at least one silicate, most preferably sodium silicate. Also the ceramic precursor powder preferably has the plasticity associated with clays, that being the characteristic of being able to be formed into a shape and maintain that shape through the firing process. Such materials are also well adapted to accept and hold glaze.

A preferred formula of the ceramic precursor powder comprises:

(a) from about 50% to about 80% clay;
(b) from about 5% to about 20% feldspar;
(c) from about 2% to about 10% refractory cement;
(d) from about 2% to about 10% frit; and
(e) from about 0.5% to about 4% sodium silicate.

In a preferred embodiment the ceramic precursor article comprises alternately deposited layers of (1) a ceramic precursor powder and (2) a binder substantially free of cellulose, in a pre-determined pattern, such that the ceramic precursor article is of the predetermined shape.

It is preferred that the binder comprises polyvinyl alcohol (PVA). It is preferred that the polyvinyl alcohol have a molecular weight in the range of 7,000 to about 15,000, and most preferably in the range of from about 9,000 to about 10,000, so as not to be too viscous for use in a 3DP machine and process. It is also preferred that the polyvinyl alcohol having a degree of hydrolysis in the range of from about 65% to about 95%, and most preferably in the range of from about 75% to about 85%. Such polyvinyl alcohols are commercially available from Sigma-Aldrich of St. Louis, Mo.

The binder may also include one or more humectants, such as glycerol, and one or more flow agents, such as ethylene glycol.

It is preferred that the binder comprises, and preferably consists essentially of, polyvinyl alcohol from about 60 to about 80%, glycerol from about 15 to about 25% and ethylene glycol from about 5 to about 15% by weight of the binder absent water. Most preferably, the binder comprises polyvinyl alcohol from about 70 to about 75%, glycerol from about 15 to about 25% and ethylene glycol from about 5 to about 15% by weight of the binder absent water.

Most preferably, the binder is substantially free of cellulose. The binder may also be in the form of aqueous clay slurry.

The ceramic article made from the ceramic precursor article shrinks less than 15%, and most preferably less than 10%, as compared to its actual size upon being subjected to sufficient heat to form a ceramic article therefrom.

Method of Preparing a Ceramic Article

The method of the present invention may be described as preparing a ceramic article of a desired final shape comprising: (a) alternately depositing layers of (1) a ceramic precursor powder as described herein and (2) a binder comprising water and polyvinyl alcohol as described herein, in a pre-determined pattern so as to form a ceramic precursor article of a precursor shape from a plurality of the layers, and (b) subjecting the ceramic precursor article to heat for sufficient time to form a ceramic article of the desired final shape.

The method of the present invention is capable of producing a ceramic article made from the ceramic precursor article that shrinks less than 15%, and most preferably less than 10%, as compared to its actual size, upon being subjected to sufficient heat to form a ceramic article therefrom.

The method of the present invention also includes a method of preparing a ceramic article of a desired final shape using a computer-driven prototyping device having a microprocessor adapted to guide its action, the method comprising: (a) obtaining digital data reflecting the desired shape; (b) applying the digital data to a microprocessor so as to guide the action of the computer-driven three-dimensional prototyping device to alternately deposit layers of (1) a ceramic precursor powder as described herein and (2) a binder comprising water and polyvinyl alcohol as described herein, in a pre-determined pattern so as to form a ceramic precursor article of the desired final shape from a plurality of the layers, and (c) subjecting the ceramic precursor article to heat for sufficient time to form a ceramic article of the desired final shape.

The method of the present invention also includes preparing a ceramic article of a desired final shape using a computer-driven prototyping device having a microprocessor adapted to guide its action, the method comprising: (a) obtaining digital data reflecting a first portion of the desired shape; (b) obtaining digital data reflecting a second portion of the desired shape; (c) applying the digital data to a microprocessor so as to guide the action of the computer-driven prototyping device to alternately depositing layers of (1) a ceramic precursor powder as described herein and (2) a binder comprising water and polyvinyl alcohol as described herein, in a pre-determined pattern so as to form ceramic precursor articles of the first and second portion of the desired shape from a plurality of the layers, and (d) subjecting the ceramic precursor article to heat for sufficient time to form a ceramic articles of the first and second portion of the desired shape; and (e) assembling the ceramic articles of the first and second portion of the desired shape into ceramic article of the desired shape.

The present invention also includes a ceramic article of manufacture made in accordance with the method of the present invention as described herein.

With respect to the ceramic precursor powder, the present invention may employ any ceramic powder that may be deposited using a 3DP layering techniques and devices. For example, the ceramic precursor powder preferably comprises: (a) from about 50% to about 80% clay; (b) from about 5% to about 20% feldspar; (c) from about 2% to about 10% refractory cement; and (d) from about 2% to about 10% frit.

A preferred ceramic recipe is: (a) from about 20% to about 30% OM4; (b) from about 20% to about 30% Cedar Height; (c) from about 20% to about 30% Fire Clay; (d) from about 10% to about 20% Neph Sy; (e) from about 2% to about 7% Sar Bond; and (f) from about 2% to about 7% 3134 Frit. The most preferred amount of these components is (a) about 25% OM4; (b) about 25% Cedar Height; (c) about 25% Fire Clay; (d) about 15% Neph Sy; (e) about 5% Sar Bond; and (f) about 5% 3134 Frit.

The ceramic precursor powder of the present invention may also include at least one silicate, such as sodium silicate in an amount in the range of from about 0.5% to about 4% by weight of the total powder.

The binder of the present invention is principally formed using an aqueous solution/suspension comprising polyvinyl alcohol, with the optional inclusion of other components such as one or more humectants as are known in the art for the binder to help prevent too much evaporation of the solution (such as glycerol) and a flow agent or viscosity modifier, as are known in the art, that helps with the flow rate of the binder, to make it possible to increase the binding action (such as ethylene glycol).

The preferred binder composition includes polyvinyl alcohol, glycerol and ethylene glycol, in addition to the solvent, such as water.

The preferred ratio ranges for each of these components is polyvinyl alcohol to glycerol to ethylene glycol are from about 5:1:1 to about 3:2:1. The preferred ranges for each of these components where they are the only components other than water is polyvinyl alcohol from about 60 to about 80%, glycerol from about 15 to about 25% and ethylene glycol from about 5 to about 15% by weight of the binder not including the liquid water portion. The preferred amount of these components is polyvinyl alcohol 70%, glycerol 20% and ethylene glycol 10% by weight of the binder not including the liquid water portion. It is preferred that the binder composition consist essentially of polyvinyl alcohol and water. It is also preferred that the binder composition consist essentially of polyvinyl alcohol and water, and at least one humectant, such as glycerol. It is most preferred that the binder composition consist essentially of polyvinyl alcohol and water, at least one humectant, such as glycerol, and at least one flow agent, such as ethylene glycol.

Another variation of the present invention is the use of a binder that may include one or more a sugars in an amount in the range of from about 100 g to about 500 g per liter of water of the binder solution, and preferably in an amount in the range of from about 250 g to about 350 g per liter of water. The preferred sugar is sucrose, although other sugars may be used. This binder variation may include other optional components such as sodium polymethacrylate such as in an aqueous solution such as Darvan (74-76 percent by weight water and 24-26 percent by weight sodium polymethacrylate). The preferred amount of Darvan liquid is in the range of from about 15 to about 26 ml per 1000 ml of water, and most preferably about 20 ml per 1000 ml of water. Other optional components include calgon liquid detergent, and sodium silicate or colloidal silica. The binder may also include relatively small amounts of carboxymethylcellulose (CMC). These optional ingredients may serve as wetting agents or provide additional binding strength. Examples of binder formulations of this variation include: (a) water 1500 ml (b) Darvan 30 ml; (c) sucrose 400 g and (d) a few drops of dye to identify the product. Another variation on the same recipe with different ingredients and proportions for instance may be: (a) water 1500 ml (b) CMC 50 ml; (c) sucrose 500 g and (d) a few drops of dye to identify the product.

The present invention also includes a ceramic precursor article having a predetermined shape, the article comprising alternately deposited layers of (1) a ceramic precursor powder and (2) a binder comprising water sugar, in a pre-determined pattern, such that the ceramic precursor article is of the pre-determined shape. It is preferred that the binder be substantially free of cellulose. The present invention may also includes a ceramic precursor article having a predetermined shape, the article comprising alternately deposited layers of (1) a ceramic precursor powder and (2) a binder substantially free of cellulose, in a pre-determined pattern, such that the ceramic precursor article is of the predetermined shape.

It is preferred that the binder composition consist essentially of sugar and water. It is also preferred that the binder composition consist essentially of sugar and water at least one humectant as are known in the art, such as glycerol. It is most preferred that the binder composition consist essentially of polyvinyl alcohol, at least one humectant, such as glycerol, and at least one flow agent as are known in the art, such as ethylene glycol.

The binder thus preferably comprises an aqueous solution or slurry of the components as described above.

It is preferred that the ceramic precursor article shrinks less than 15% as compared to its actual size upon being subjected to sufficient heat to form a ceramic article therefrom, and most preferably less than 10%.

The present invention also includes a method of preparing a ceramic article of a desired final shape comprising: (a) alternately depositing layers of (1) a ceramic precursor powder as described herein and (2) a binder comprising water, sugar and sodium silicate as described herein, in a pre-determined pattern so as to form a ceramic precursor article of a precursor shape from a plurality of the layers, and (b) subjecting the ceramic precursor article to heat for sufficient time to form a ceramic article of the desired final shape.

It is preferred that the ceramic precursor article shrinks less than 15% as compared to its actual size upon being subjected to sufficient heat to form a ceramic article therefrom, and most preferably less than 10%. It is likewise preferred that the desired final shape differs from the precursor shape by less than 15%, preferably less than 10%, and that most preferably the desired final shape differs is substantially the same as the precursor shape.

The present invention also includes a method of preparing a ceramic article of a desired final shape using a computer-driven prototyping device having a microprocessor adapted to guide its action, the method comprising: (a) obtaining digital data reflecting the desired shape; (b) applying the digital data to a microprocessor so as to guide the action of the computer-driven prototyping device to alternately depositing layers of (1) a ceramic precursor powder and (2) a binder substantially free of organic material, in a pre-determined pattern so as to form a ceramic precursor article of the desired final shape from a plurality of the layers, and (c) subjecting the ceramic precursor article to heat for sufficient time to form a ceramic article of the desired final shape.

The method of the present invention also includes a method of preparing a ceramic article of a desired final shape using a computer-driven prototyping device having a microprocessor adapted to guide its action, the method comprising: (a) obtaining digital data reflecting a first portion of the desired shape; (b) obtaining digital data reflecting a second portion of the desired shape; (c) applying the digital data to a microprocessor so as to guide the action of the computer-driven prototyping device to alternately depositing layers of (1) a ceramic precursor powder as described herein and (2) a binder as described herein, in a pre-determined pattern so as to form ceramic precursor articles of the first and second portion of the desired shape from a plurality of the layers, and (d) subjecting the ceramic precursor article to heat for sufficient time to form a ceramic articles of the first and second portion of the desired shape; and (e) assembling the ceramic articles of the first and second portion of the desired shape into ceramic article of the desired shape.

Method Of Preparing a Ceramic Article Precursor within Compression Step

The present invention also includes a method of preparing a ceramic article precursor by the sequential alternative application of layers of material as follows: (a) a layer of a ceramic precursor powder; and (b) a layer of an aqueous liquid binder solution having at least one water-soluble binder dissolved in water; so as to form a sequential material layer having an original thickness; and (c) compressing each sequential material layer so as to reduce the original thickness thereof, prior to the deposition of a subsequent sequential material layer; so as to form a ceramic precursor article.

Method of Preparing a Ceramic Article within Compression Step

The present invention further includes a method of preparing a ceramic article of a desired final shape comprising: (a) alternately depositing layers of (1) a ceramic precursor powder and (2) a binder, such as one comprising water and polyvinyl alcohol, each the alternate layers (1) and (2) having an original thickness, in a pre-determined pattern so as to form a ceramic precursor article of a precursor shape from a plurality of the layers, (b) following each deposition of layers (1) and (2), compressing each the alternate layer so as to reduce its original thickness; and (b) subjecting the ceramic precursor article to heat for sufficient time to form a ceramic article of the desired final shape.

This method has the effect of compacting the layers as they are formed, so as to place the constituent materials in more intimate contact. This leads to a stronger ceramic precursor article and ultimately to a finished ceramic that has reduced shrinkage and porosity.

The compression step my be performed by an apparatus as described herein, as well as by any other apparatus that is capable of providing controllable compression force to the object being formed without disrupting its intended shape.

Compression Apparatus—Apparatus for Preparing a Ceramic Article Precursor within Compression Step Also part of the present invention is an apparatus for preparing a ceramic article precursor by the sequential alternative application of layers of material as follows: (a) a supply bed adapted to contain a supply of a ceramic precursor powder and a powder supply head adapted to transport and deposit layers of the ceramic precursor powder; (b) a binder depositor adapted to produce a patterned layers of a liquid an aqueous liquid binder solution having at least one water-soluble binder dissolved in water; (c) a build table positioned and adapted to accept alternating layers of the ceramic precursor powder from the powder supply head, and the aqueous liquid binder solution from the binder depositor; and to be lowered following each layer deposition; and (d) a tamper member adapted to compress successive alternating layers of the ceramic precursor powder and the aqueous liquid binder solution, so as to reduce the original thickness thereof.

It is preferred that the tamper member be actuated by a motor controlled by microprocessor or other control apparatus that applies an algorithm adapted to calculate the required dimensions of a given binder layer by determining the change in the original thickness of a binder/powder layer, and adjusting the dimensions of subsequent binder layers according to the reduction in overall height of the ceramic precursor as it is being built. That is, the algorithm determines the binder layer pattern next required in sequence based upon the regression in the build-up brought about by the know reduction in overall height of the object (based upon the controlled tamping compression of each layer) after each compression step.

This method may be used to prepare arrangements of more than one ceramic piece, such as may be required in ceramic constructions of any kind, such as anything from artistic forms, installations and murals, or multi-piece industrial constructions and arrangements where such multi-piece constructions are required or desirable. Examples may include filter arrangements, protective ceramic tiles, bricks, etc., and ceramic pieces having more than one piece that fit together, such as containers. Accordingly, the present invention allows for the creation of clay body formulas and binder recipes for use in a rapid prototyping process, consistent with industry standards for other types of ceramic fabrication, and processes including pottery, tile and brick.

The present invention also includes a ceramic article of manufacture made in accordance with the method of the present invention as described herein.

In accordance with the present invention, ceramic precursor articles may be successfully rendered and then fired at high temperature (i.e., using traditional kilns at temperatures of 1500-2000 degrees C.) to obtain ceramic positives. The ceramic article may be treated with any glazing as is known and applied in the art.

The objects produced in accordance with the present invention may be used to demonstrate the possible applications of this process. The ceramic objects obtained by this process have evidenced an average reduction of 15% and some have been subject to different types of glazing and surface treatments, as are known and applied in this field.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

Figure 1:
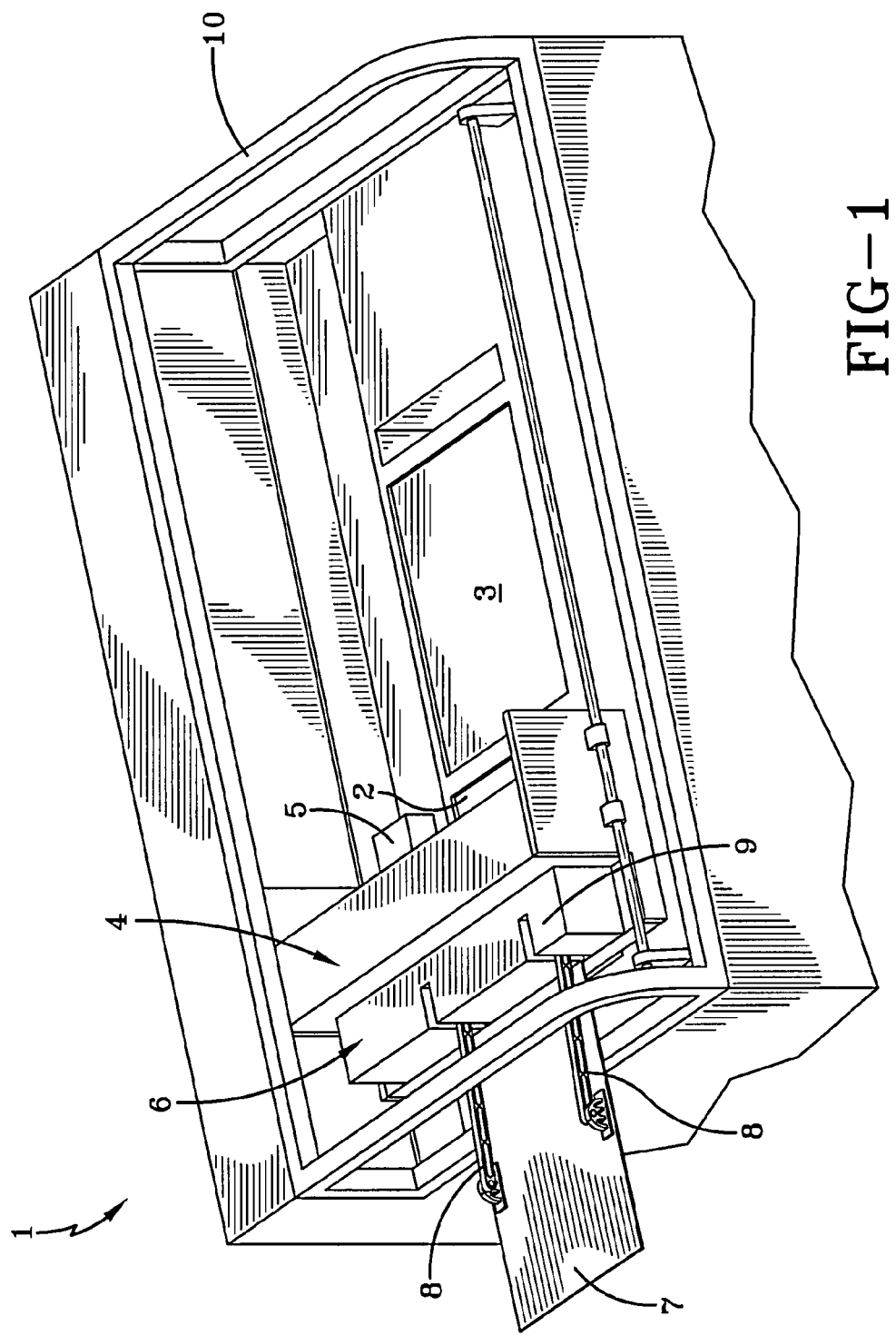
FIG. 1 is a perspective view of an apparatus in accordance with one embodiment of the present invention.

In accordance with the foregoing summary, the following present a detailed description of the present invention, which is presently considered to be the best mode thereof.

As an example of the present invention, a digital representation of Martin Newell's teapot was prepared obtained. This is a shape commonly used in computer graphics, 3D modeling, and 3D animation. A teapot is a challenging object to experiment with for its shape and form within the context of 3D software development. That same teapot serves as an excellent subject model to demonstrate the present invention.

The present invention allows for the fabrication of an article, such as a teapot, accurate in dimensions to the desired shape, and thus the production of sculptural objects and other object applications are possible. In accordance with the present invention, it is feasible to create a virtual 3D design that can become a functional object made of durable ceramic materials without the need to first prepare a prototype from which a mold is made. Rather, the present invention allows for the direct formation of a finished ceramic piece without the need for prototyping and mold making.

The use of binders and clay formulas of the present invention allow for the 3DP rapid prototyping processes and apparatus to be used to efficiently prepare final shaped ceramic pieces.

One of the aspects of the present invention is the creation of clay body formulae and binder recipes for use in a rapid prototyping process, consistent with industry standards for other types of ceramic fabrication and treatment processes, including those used to make pottery, tile and brick.

The testing standards can be organized around three main components: (1) shrinkage—important during each phase of fabrication; and (2) absorption and density through vitrification (absorption); and (3) strength—green, bisque and fired.

In order to prepare a ceramic article in accordance with the present invention, an example of the object may be imaged using either 2D or 3D imaging techniques in order to obtain a computer files or data representative of the object and adapted to be used to guide the 3DP machine. This may be done for instance using a scanner such as the ZScanner 700 commercially available from Z-Corp. One may extrapolate from 2D imaging for this purpose.

A 3DP machine, such as the ZPrinter 310 Plus, commercially available from Z-Corp is loaded with the ceramic powder and the binder in accordance with the present invention. The computer file(s) to guide the layered deposition are transferred to the machine and the machine deposits alternately layers of the binder and ceramic power such that a ceramic precursor of the desired shape is formed though the computer guidance obtained from the scanner. Computer instructions may also be converted from CAD files of the desired shape, such as by use of the ZPrint Software, commercially available from Z-Corp.

Typically and preferably, this is done with one-to-one ratio of the binder and ceramic powder, alternating one atop the other, although other layering arrangements may be found effective to create a precursor shape.

After the ceramic precursor of the desired shape is formed, it may be fired and/or glazed in accordance with methods and apparatus known and used in the art.

In the case of a teapot, the pot and cover may be scanned and deposited as individual pieces.

Figure 13:
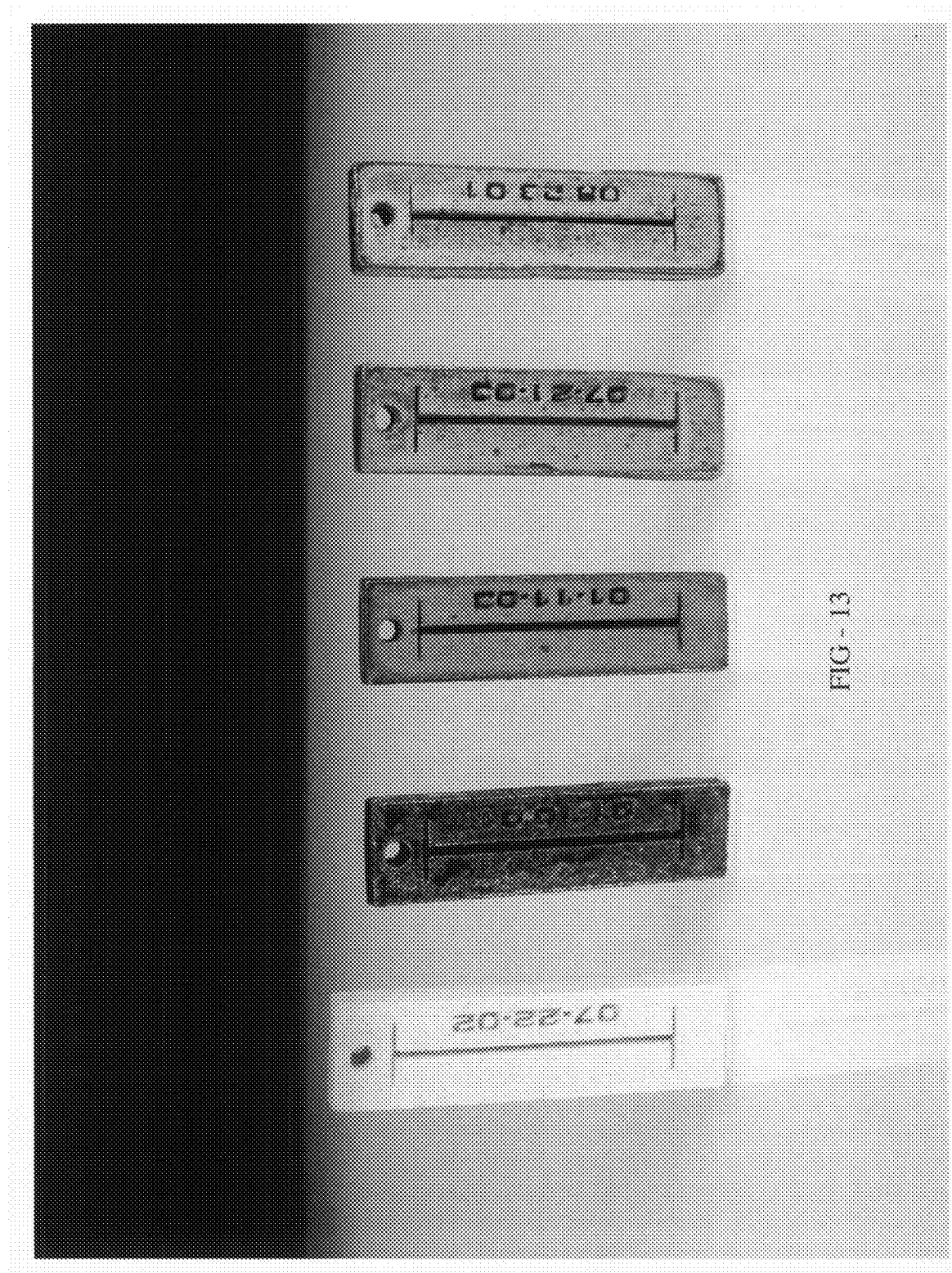
FIG. 13 is a perspective view of test bars in accordance with one embodiment of the present invention.

The present invention may be also demonstrated by the use of a basic standard test bar that may be used to measure the properties of the precursor through each stage of the process. Examples are seen in FIG. 13. A virtual model of a test bar may be rendered in multiples each time material is run through the machine. Given that many test bars can be made during each run of the printer, it will be possible for instance to create a fine art object and five test bars in one printing session. Below is a description of each component.

Shrinkage

Each bar will have a 10 cm demarcation rendered directly into the bar. The bars may be measured after each process of air-drying, bisque firing, and final firing. The difference of the various measurements provides crucial data for shrinkage in a manner consistent with industry standards for all ceramic applications. The data for each formula modification may then be logged into a database and then compared to other known industry formulas. This will allow for one to control for shrinkage by preparing ceramic precursor articles with the amount of shrinkage to be allowed for, such that the desired accurate shape and size of the finished ceramic piece may be achieved. This may be done either in cases where the shrinkage of the unfinished (unfired) article places the article still within desired manufacturing tolerances, or in cases where the shrinkage of a given precursor binder-powder formulation is known such that it may be considered so as to arrive at the desired size of the finished article.

Absorption and Density

In order to determine the absorption and density of the precursor article made in accordance with the present invention, each bar will may be weighed immediately as it is removed from the printer. This base weight contains the total wet weight of the object. The bar may then be weighed after it has completely air-dried. (A small dryer may be used to eliminate variations in ambient air humidity, if desired). The difference between the dry weight and the wet weight will indicate the amount of liquid (in the binder) used to bind the powder, which is needed to determine the effects of different binder recipes and to measure consistency in the printing process. To determine the absorption of the sample, each bar may be weighed after it has been fired to a specific temperature, soaked for twenty-four hours in water, and weighed again. The tests may then be boiled for about two hours and weighed again; this will measure the coefficient of expansion, which is important information for clays that will be placed outdoors and in other harsh environments. The parameters of this test are known and used in industry.

Strength Testing

It typically will be important to monitor is green strength; i.e., is the object rendered durable enough to be handled after it is removed from the printer and placed in the kiln? It is preferred that the ceramic precursor objects in the green state be strong enough to be handled to be safely placed in the kiln.

This strength is directly related to the effectiveness of the binder and can easily be measured by the following simple test. The bar may suspended on both ends and weight is incrementally applied to the center of the bar until it fails. The same test may be applied to the bar after firing to determine basic fired strength data. Bars of the same size and shape may be made with traditional fabrication methods and a known formula to establish a base-line measurement for comparison in further experiments. Eventually the best of the formulas may be sent to a ceramic lab to find the specific "Modulus of Rupture". These data may then be compared with industry parameters for the object to be produced, if desired. This testing may confirm what is already observed in ceramic precursors produced in accordance with the present invention, and may be able to quantify it with industry standards.

Variations may be made from the preferred ceramic powder and binder formulation as desired for various applications. It is preferred that all tests be controlled and logged with all information needed for replication and confirmation. It is preferred that one not make changes both to the binder and the formula for each run as it is preferred to maintain one variable constant. That is, if one changes a material or its ratio in the clay formula, preferably one must measure it using the same binder. Likewise, if one changes the binder, one should compare those results on the same formula. While this complicates the testing procedures, it is possible to do given that effective binders and ceramic powder formulas are disclosed herein. It is important to note that all of the clay formulas may consist of materials that have been tested and chemically analyzed using a computer program that contains this information and can instantly calculate the molecular formula of any combination of the possible ingredients. Such computer programs are typically used in glaze and clay body calculations.

This testing provides crucial information as to the viability of specific formulas and binders. In addition to the tests described above, other tests may be done related to various ceramic processes including glazing and pyroplasticity (warping during firing). Some test bars may be glazed using various techniques and process and measured for "glaze fit" and other important phenomena related to potential applications of the present invention.

FIG. 13 is a perspective view of a series of test bars produced in accordance with the method of the present invention. Table 1 contains data from several test runs using the method of the present invention. Some of the significant aspects of the results reported in Table 1 are the reduced amount of shrinkage achieved through the method of the present invention, even without using the layer compression method of the present invention. The significant aspects of the results include the reduction in distortion and friction cracks.

The present invention also includes a three-dimensional printing apparatus and printing method.

Referring to the Figures, FIG. 1 shows three-dimensional printing device 1 having supply bed 2 and build table 3.

Powder transport unit 4 is also bears reciprocating binder print head 5.

On the trailing portion of powder transport unit 4 is compressor plate mechanism 6 which includes compressor plate 7 and actuator arms 8.

Figure 2:
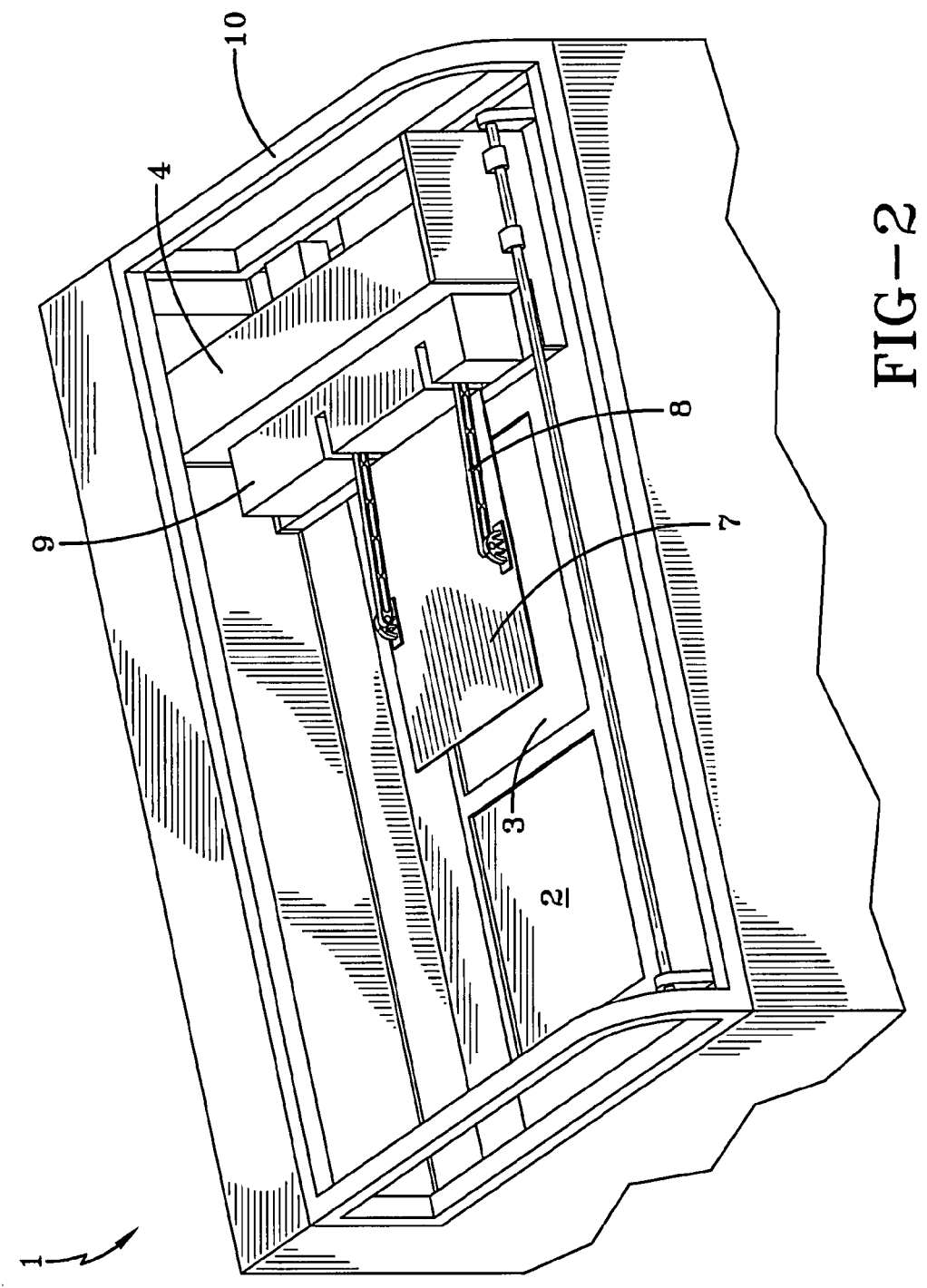
FIG. 2 is a perspective view of an apparatus in accordance with one embodiment of the present invention.

In operation, powder transport unit 4 reciprocates between the position A as shown in FIG. 1 and position B as shown in FIG. 2. As the powder transport unit 4 moves from position A to position B, it takes ceramic powder from supply bed 2 and deposits a layer of ceramic powder across build table 3.

Powder transport unit 4 then reverses direction across build table 3 whereby reciprocating binder print head 5 deposits a layer of binder such as described herein.

This process is repeated as the build table is lowered to build a three-dimensional ceramic precursor article.

Following each successive deposit of a layer of powder (where powder transport unit 4 reaches position B), compressor plate 7 borne by actuator arms 8 provides a compressing downward tamping to each successive binder/powder layer as it is formed. This may be seen by reference to the position of compressor plate 7 and actuator arms 8 in FIGS. 2 and 3. The compressor plate 7 in its lowered position may also be seen in FIGS. 4-6. This has the effect of making the composite green article so formed better able to maintain its green strength, while ultimately leading to the production of a stronger ceramic piece as the constituent materials are placed in more intimate contact between the binder and powder layers before firing.

The action of the compressor plate 7 and actuator arms 8 may be controlled by an electronic actuator subject to algorithmic control. As each layer is placed and reduced in thickness by compression, the algorithmic controller adjusts the subsequent layer to be deposited in order to accommodate for the vertical displacement of each layer in the cross-sectional series of deposition. That is, as each binder/powder layer is compressed, the height of the article thus far produced is reduced from where is otherwise would be prior to compression. Accordingly, the programming algorithm controls the deposition to accommodate the resultant height of the post-compression article in determining the pattern to be laid in the next sequential deposit. This may be accomplished by amendments to the computer programming used in current three-dimensional printing devices to make mathematic changes to accommodate the regression in the cross-sectional series brought about through the known amount of thickness reduction brought about by compression.

Figure 3:
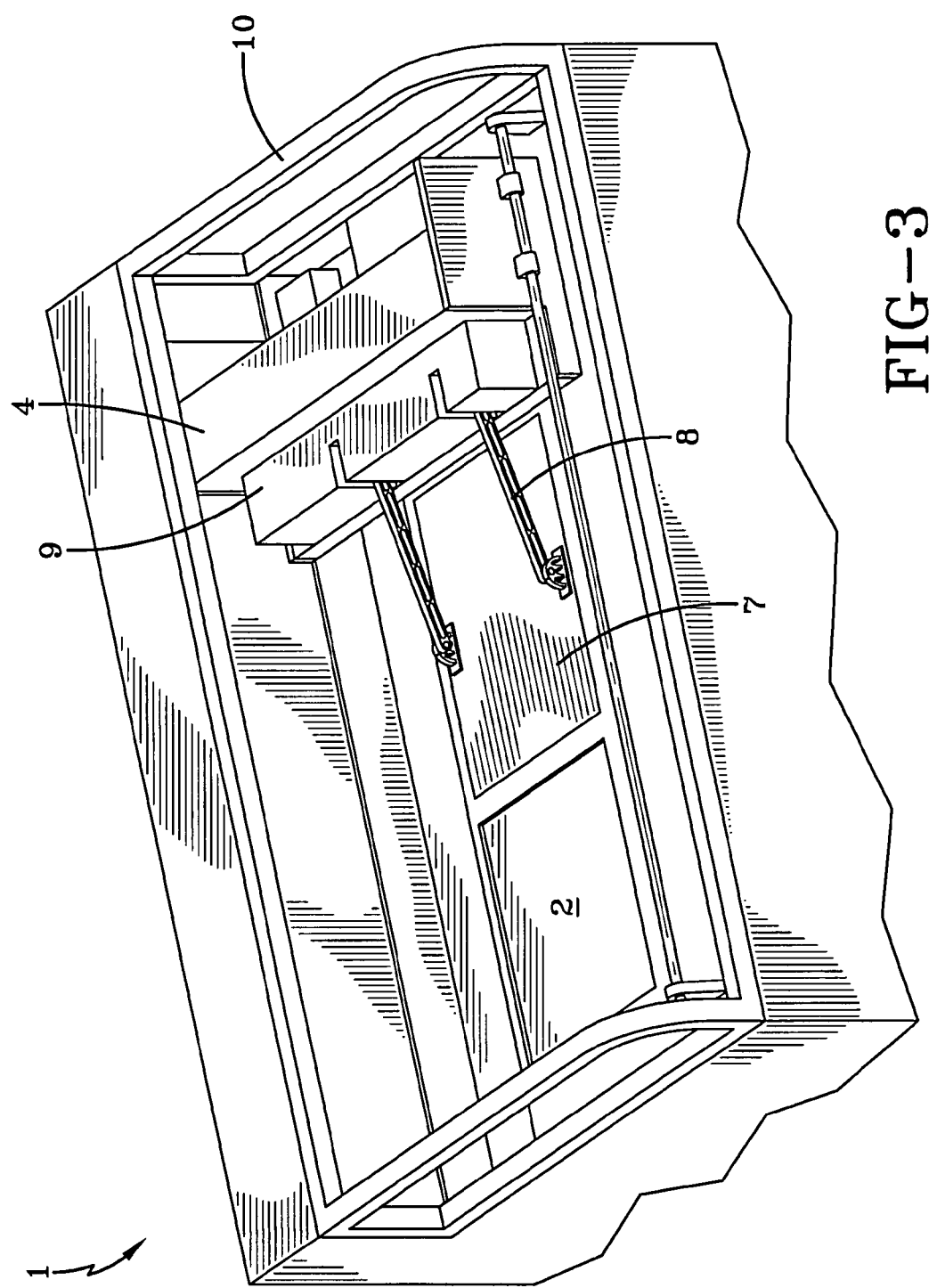
FIG. 3 is a perspective view of an apparatus in accordance with one embodiment of the present invention.
Figure 4:
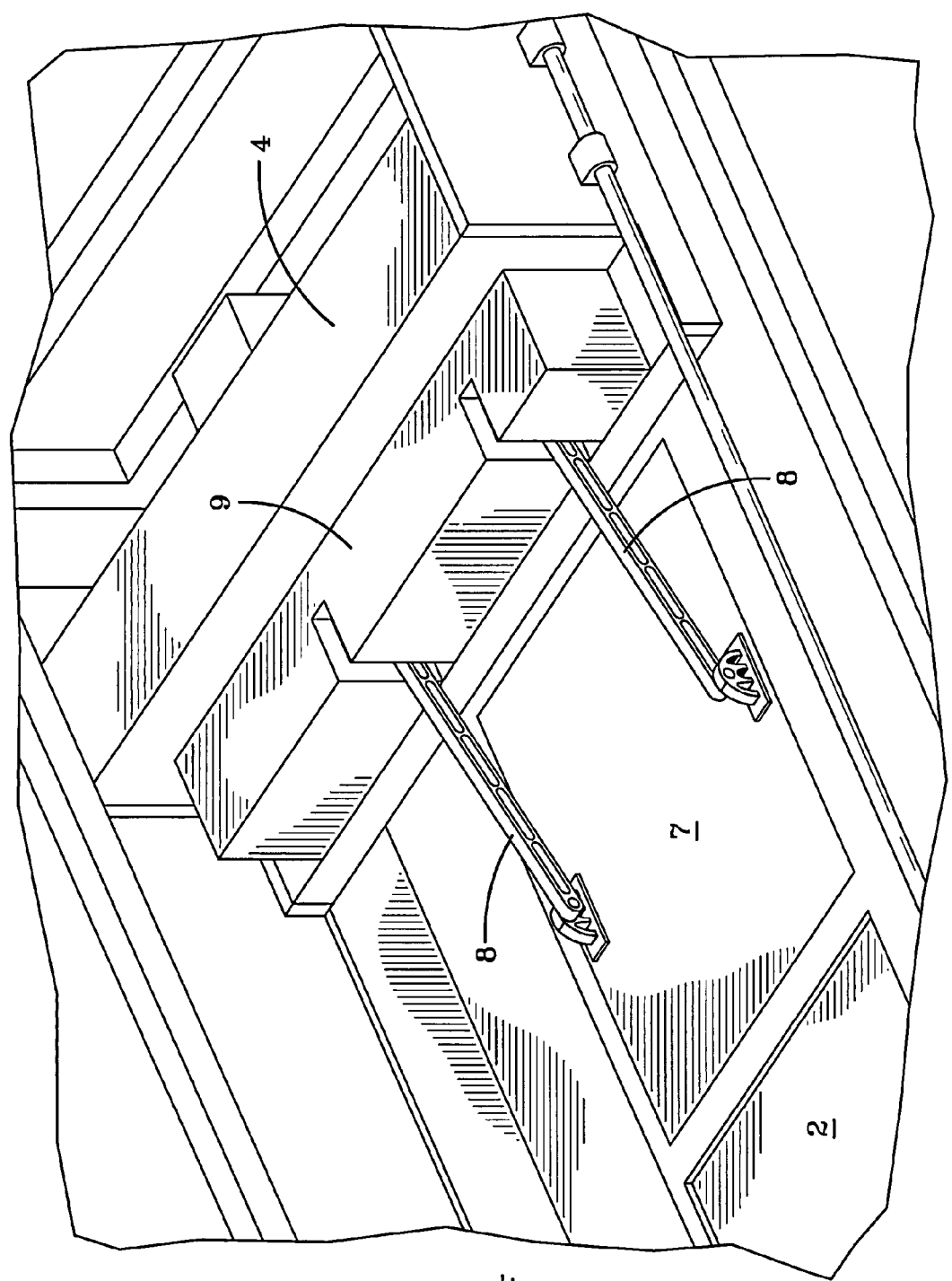
FIG. 4 is a detailed perspective view of an apparatus in accordance with one embodiment of the present invention.
Figure 5:
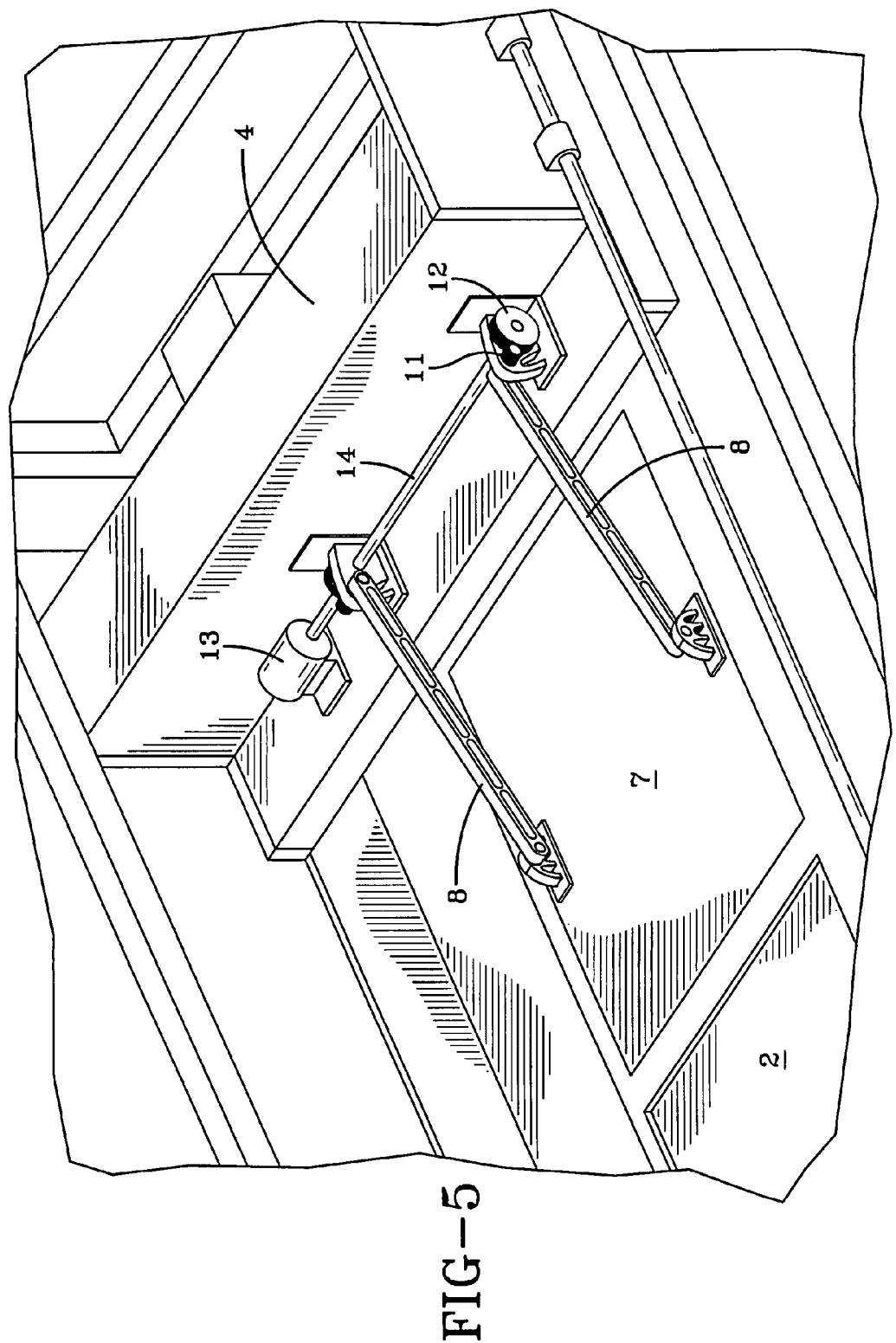
FIG. 5 is a detailed perspective view of an apparatus in accordance with one embodiment of the present invention.
Figure 6:
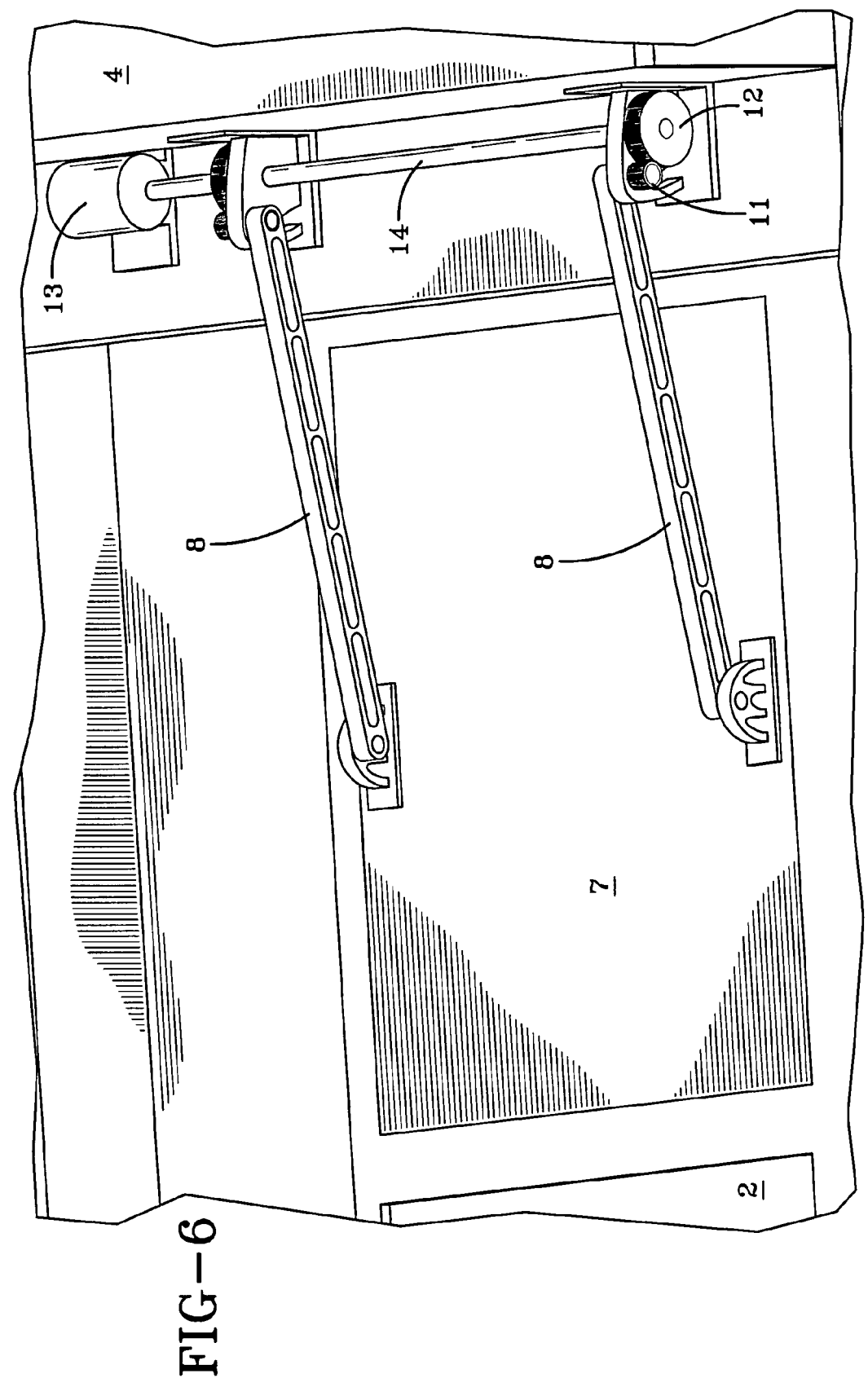
FIG. 6 is a detailed perspective view of an apparatus in accordance with one embodiment of the present invention.

FIGS. 4-6 show detailed views of the compressor plate 7 and actuator arms 8 in more detail, with the compressor plate 7 in its lowered position, as seen in FIG. 3. FIG. 4 shows the tamping mechanism with cover 9, while FIGS. 5 and 6 show views with cover 9 removed. These Figures also show gears 11 and 12 (which may also be friction wheels as an alternative), as well as electric motor 13 which turns shaft 14 so as to provide light tamping displacement against the sequential layers of the ceramic precursor as it is being built in sequential layers in build table 3.

Figure 7:
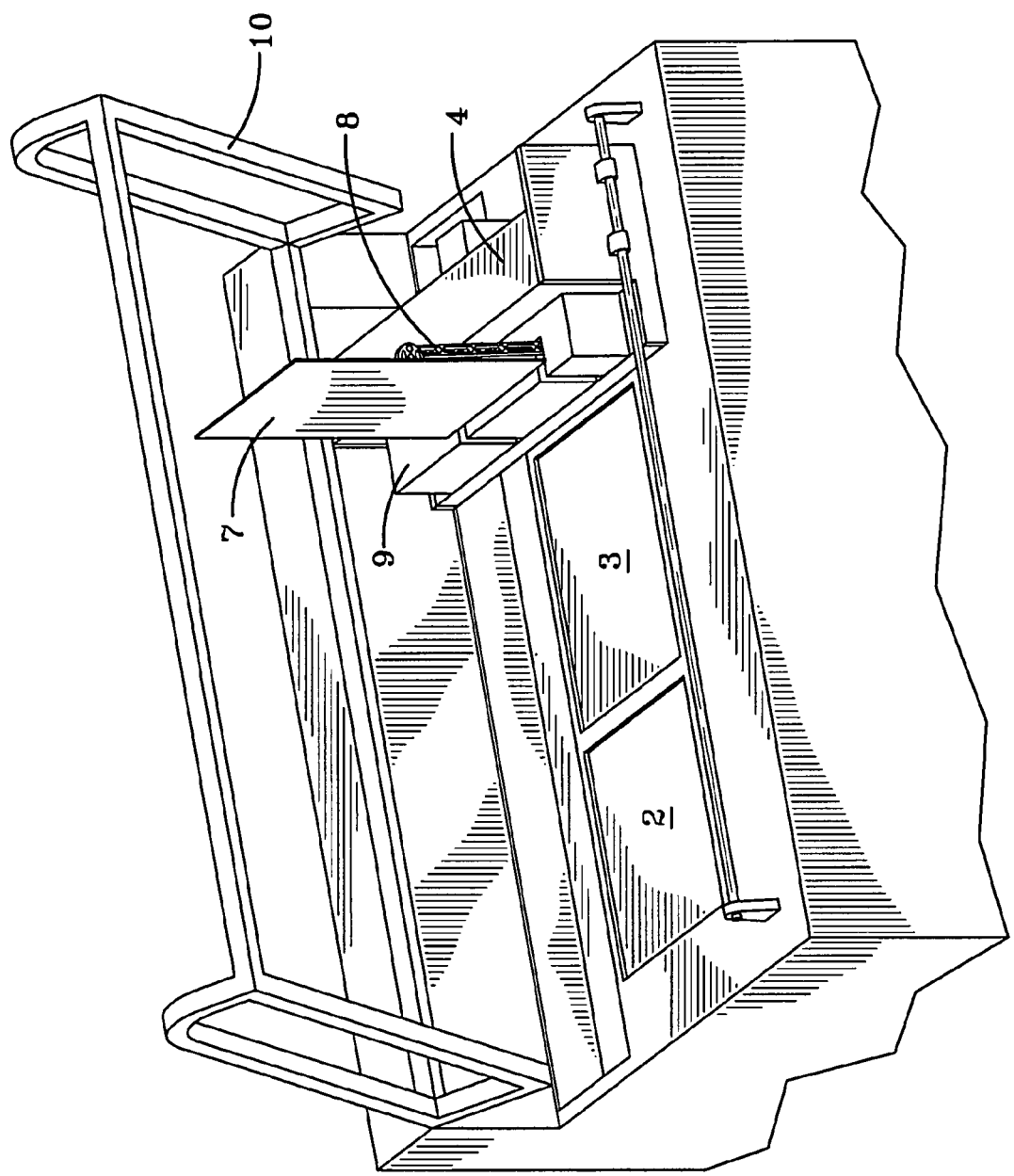
FIG. 7 is a detailed perspective view of an apparatus in accordance with one embodiment of the present invention.

FIG. 7 shows the compressor plate 7 and actuator arms 8 in a raised position after the protective cover 10 of three-dimensional printing device 1 has been raised. This allows for the removal of the finished ceramic precursor piece for clean-up and firing.

The present invention may be used in a wide variety of artistic and industrial applications. One such application is in the area of ceramic filters. Ceramic articles of the present invention have been found to have relatively uniform porosity, such that they may find advantageous use as ceramic filters in a wide variety of industrial applications.

Still another application of the present invention is to provide replacement parts for ceramic constructions, industrial or artistic, where a piece has become broken or lost altogether. For instance, in preparing filler pieces to display archeological ceramics to be able to support and secure such items, the missing portion(s) may be obtained through digital scanning, and the missing piece prepared using the method of the present invention. Likewise, broken or missing industrial ceramic articles may be repaired or replaced, for instance by scanning a broken insulative tile to obtain a 3D digital image of the missing portion of the tile, in order to provide a replacement piece sized to fit precisely the space requiring repair.

Because the present invention allows for the direct and true-to-size creation of finished ceramic articles, one may create customized ceramic articles to fit or retrofit industrial, artistic or archeological articles, arrangements and installations efficiently.

Figure 8:
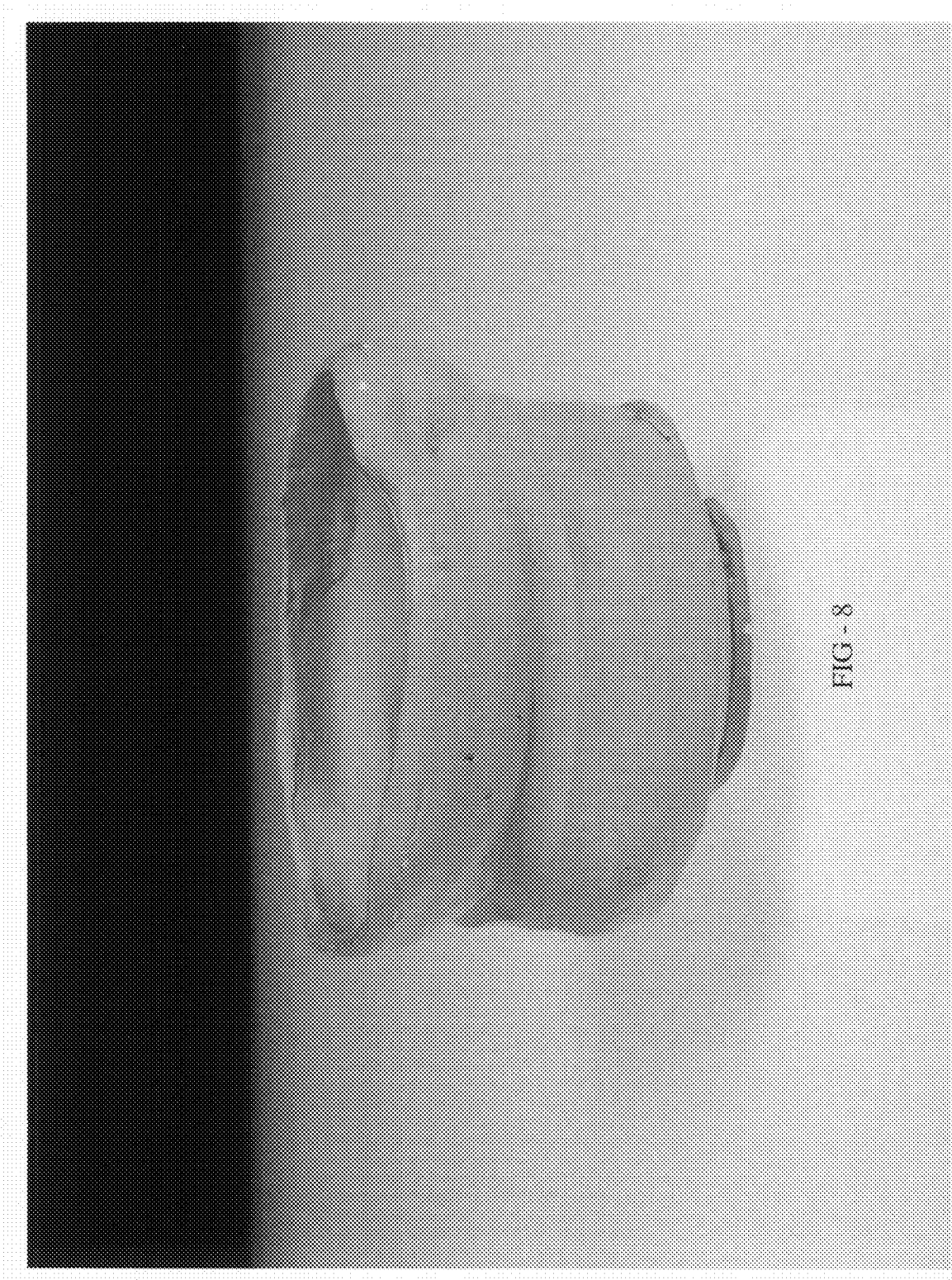
FIG. 8 is a perspective view of an original article that may be reproduced in accordance with one embodiment of the present invention.
Figure 9:
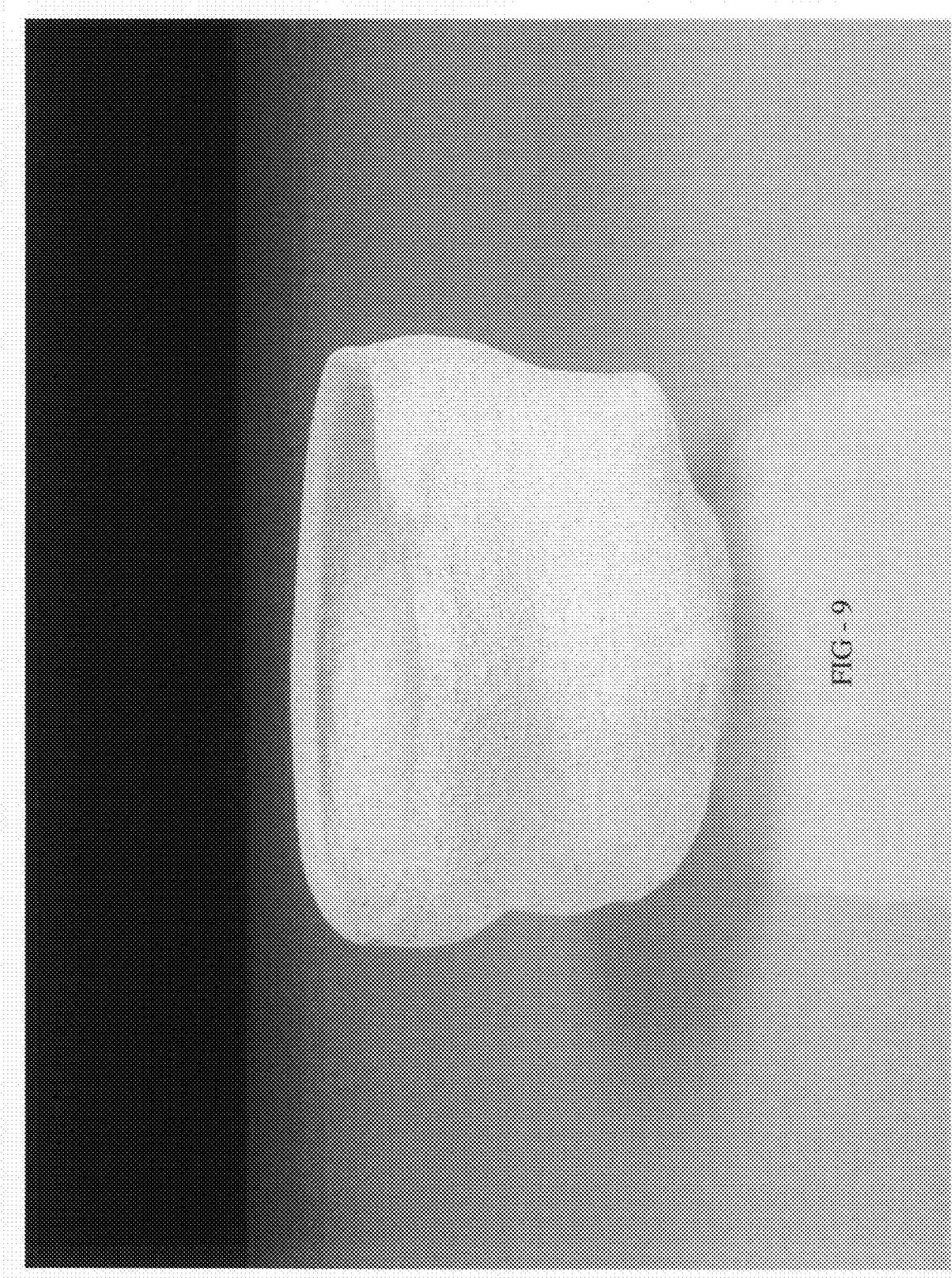
FIG. 9 is a perspective view of a ceramic article prepared as a copy of the original article of FIG. 8, in accordance with one embodiment of the present invention.
Figure 10:
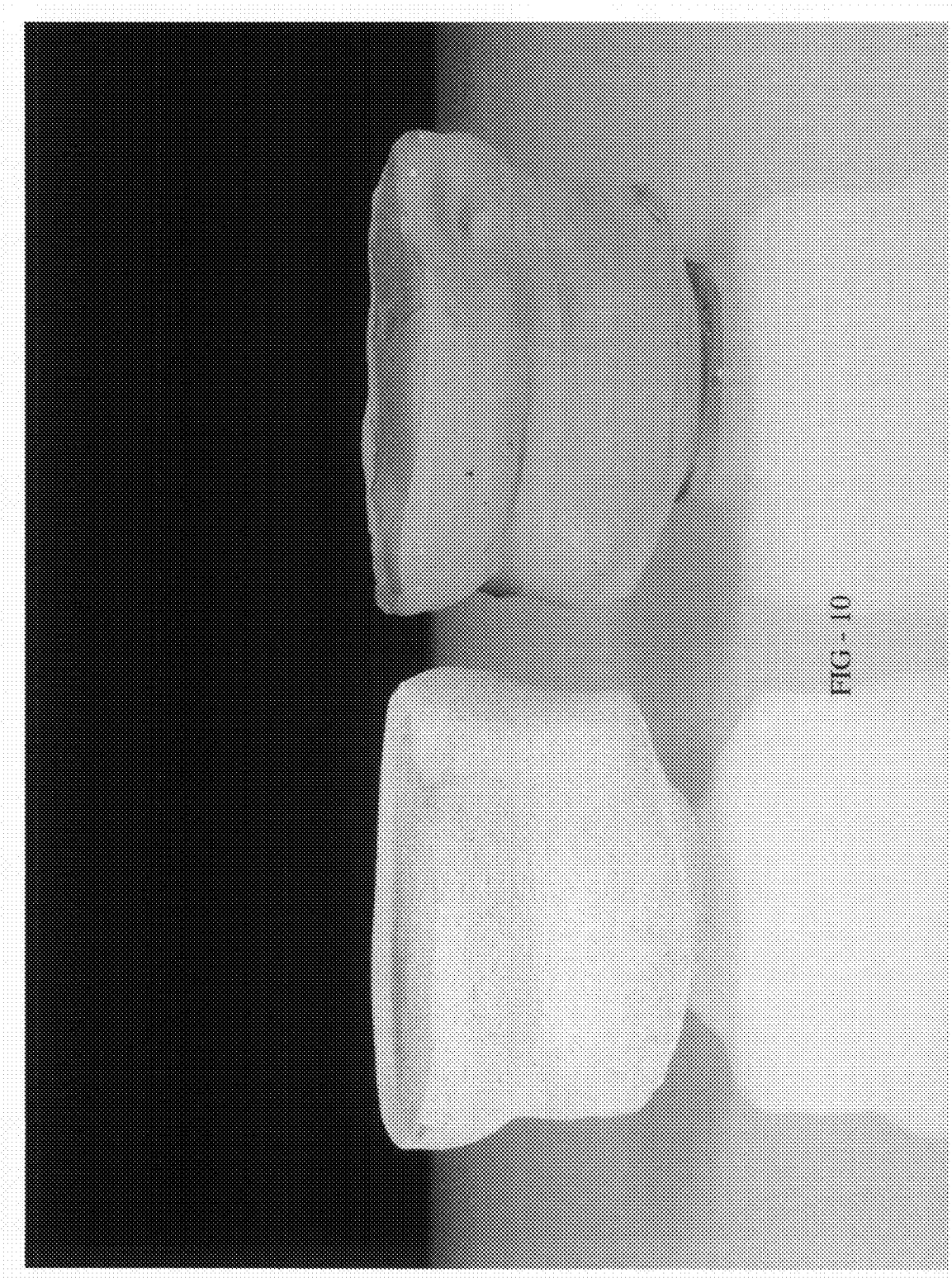
FIG. 10 is a perspective comparative view of the original article of FIG. 8 and the ceramic article shown in FIG. 9.

An example of a ceramic object (i.e., a hand rendered ceramic) that may be reproduced in accordance with the present invention is shown in FIG. 8. FIG. 9 shows a perspective view of a fired ceramic object made from the three dimensional digital rendering and printing process of the present invention as applied to the ceramic object of FIG. 8. FIG. 10 shows a comparative perspective view of the original ceramic object shown in FIG. 8 and the finished ceramic object produced in accordance with one embodiment of the present invention shown in FIG. 9.

Figure 11:
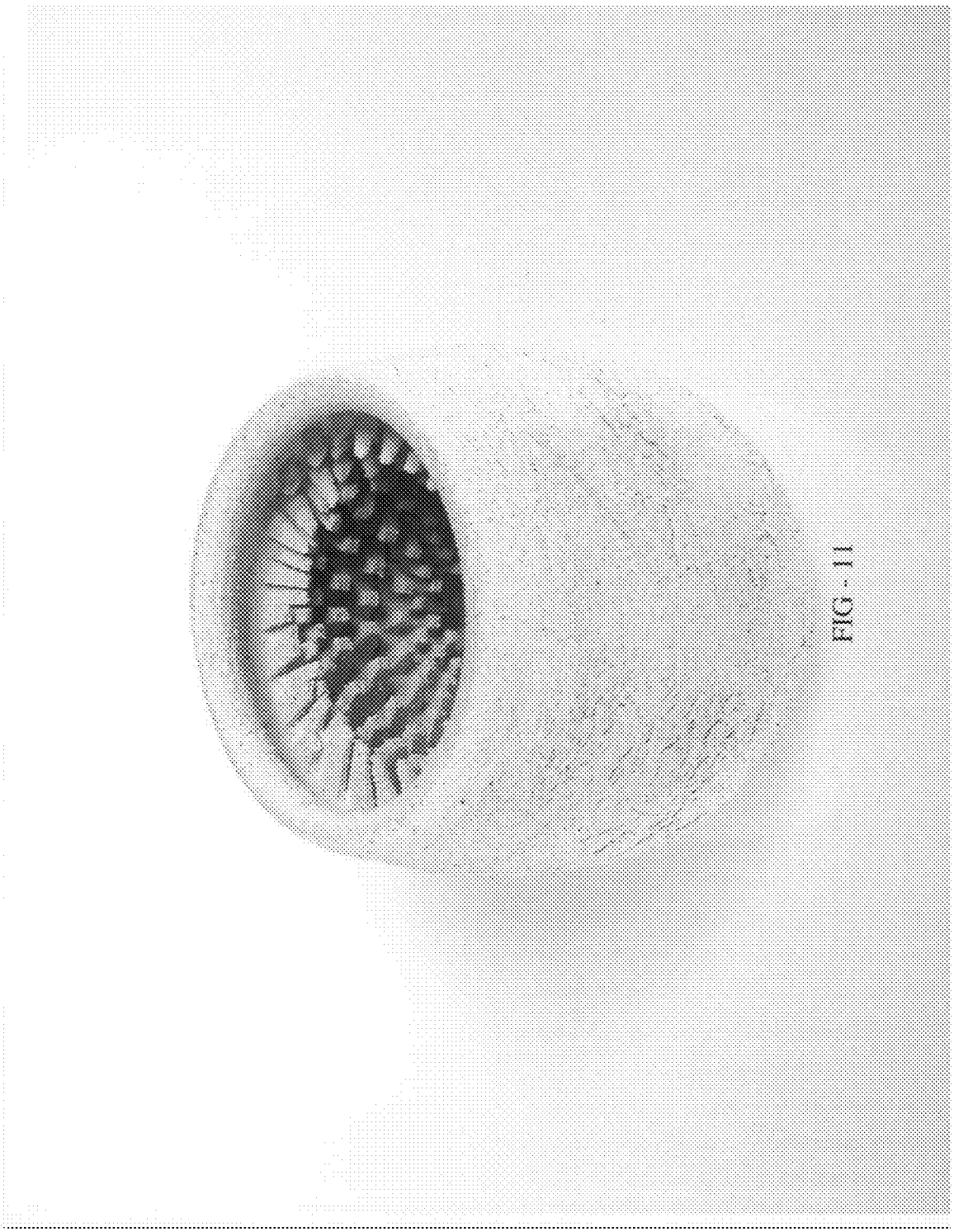
FIG. 11 is a perspective view of an article made in accordance with one embodiment of the present invention.
Figure 12:
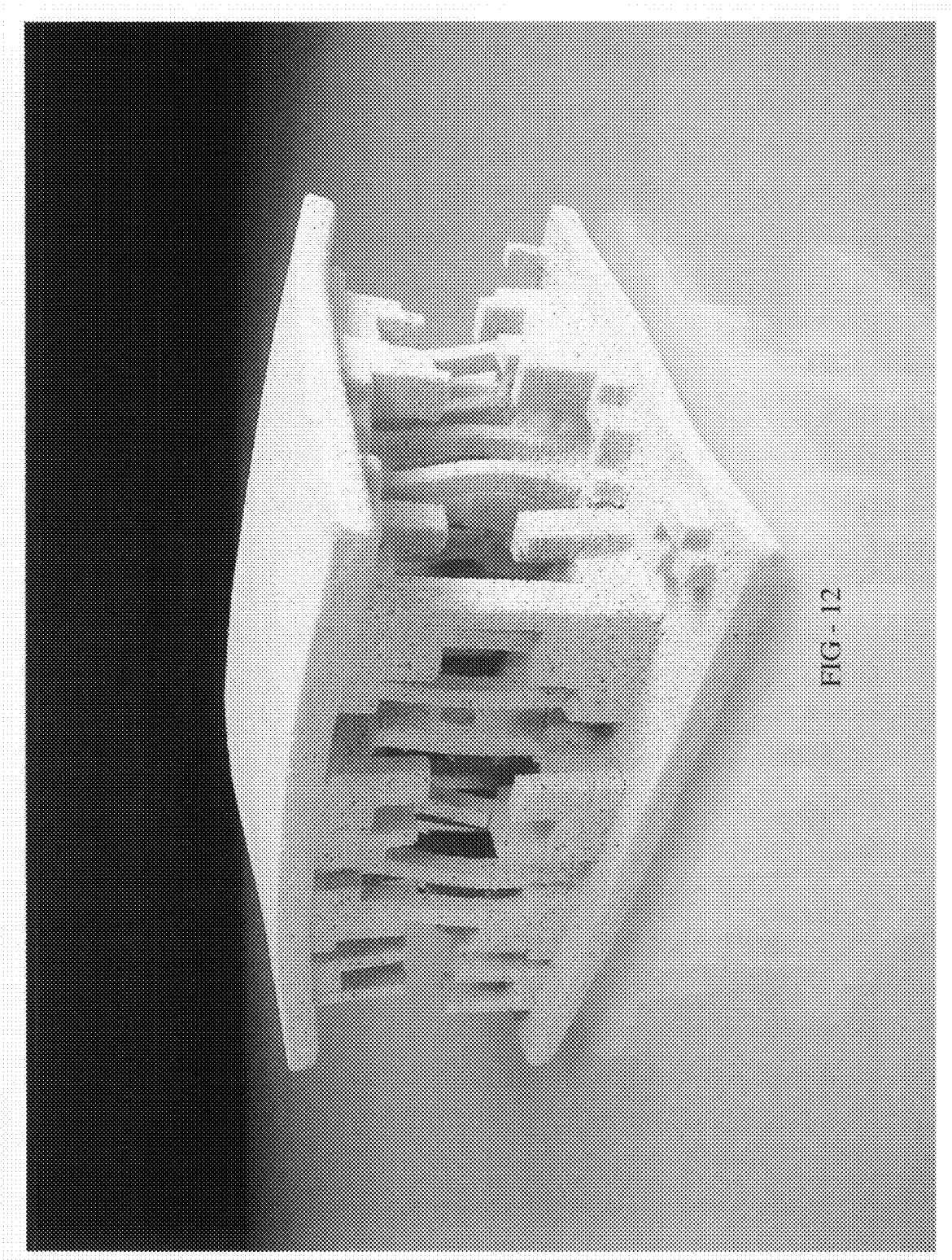
FIG. 12 is a perspective view of another article made in accordance with one embodiment of the present invention.

Other examples of finished ceramic articles made in accordance with the method of the present invention and that would otherwise be impossible to make through standard molding techniques, owing to the presence of undercut in the piece, are shown in FIGS. 11 and 12.

All of the patents and other publications referred to herein are hereby incorporated herein by reference.

What is claimed is:

1. A ceramic precursor article having a predetermined shape, said article comprising alternately deposited layers of (1) a ceramic precursor powder comprising from about 50% to about 80% clay, from about 5% to about 20% feldspar, from about 2% to about 10% refractory cement, from about 2% to about 10% frit, and from about 0.5% to about 4% sodium silicate and (2) a binder comprising water and polyvinyl alcohol, in a pre-determined pattern, such that said ceramic precursor article is of said predetermined shape.

2. A ceramic precursor article according to claim 1 wherein said binder comprises polyvinyl alcohol having a molecular weight in the range of 7,000 to about 15,000.

3. A ceramic precursor article according to claim 1 wherein said binder comprises polyvinyl alcohol having a molecular weight in the range of from about 9,000 to about 10,000.

4. A ceramic precursor article according to claim 1 wherein said binder comprises polyvinyl alcohol having a degree of hydrolysis in the range of from about 65% to about 95%.

5. A ceramic precursor article according to claim 1 wherein said binder comprises polyvinyl alcohol having a degree of hydrolysis in the range of from about 75% to about 85%.

6. A ceramic precursor article according to claim 1 wherein said binder comprises polyvinyl alcohol, at least one humectant and at least one flow agent.

7. A ceramic precursor article according to claim 1 wherein said binder is substantially free of cellulose.

8. A ceramic precursor article according to claim 1 wherein said binder comprises polyvinyl alcohol from about 60 to about 80%, glycerol from about 15 to about 25% and ethylene glycol from about 5 to about 15% by weight of the binder absent water.

9. A ceramic precursor article according to claim 1 wherein said binder comprises polyvinyl alcohol from about 70 to about 75%, glycerol from about 15 to about 25% and ethylene glycol from about 5 to about 15% by weight of the binder absent water.

10. A ceramic precursor article according to claim 1 wherein said ceramic article shrinks less than 15% as compared to its actual size upon being subjected to sufficient heat to form a ceramic article therefrom.

11. A method of preparing a ceramic article of a desired final shape comprising:

(a) alternately depositing layers of (1) a ceramic precursor powder comprising from about 50% to about 80% clay, from about 5% to about 20% feldspar, from about 2% to about 10% refractory cement, from about 2% to about 10% frit, and from about 0.5% to about 4% sodium silicate and (2) a binder comprising water and polyvinyl alcohol, in a pre-determined pattern so as to form a ceramic precursor article of a precursor shape from a plurality of said layers, and (b) subjecting said ceramic precursor article to heat for sufficient time to form a ceramic article of said desired final shape.

12. A method according to claim 11 wherein said binder comprises polyvinyl alcohol, at least one humectant and at least one flow agent.

13. A method according to claim 11 wherein said binder is substantially free of cellulose.

14. A method according to claim 11 wherein said binder comprises polyvinyl alcohol from about 60 to about 80%, glycerol from about 15 to about 25% and ethylene glycol from about 5 to about 15% by weight of the binder absent water.

15. A method according to claim 11 wherein said binder comprises polyvinyl alcohol from about 70 to about 75%, glycerol from about 15 to about 25% and ethylene glycol from about 5 to about 15% by weight of the binder absent water.

16. A method according to claim 11 wherein said ceramic article shrinks with respect to the size of said ceramic precursor article less than 15%.

17. A method according to claim 11 wherein said desired final shape differs from said precursor shape by less than 10%.

18. A ceramic article made by the method of claim 11.

* * * * *